(12) United States Patent
Venne et al.

(10) Patent No.: US 8,648,254 B2
(45) Date of Patent: Feb. 11, 2014

(54) DEVICE AND METHOD FOR STRINGING OVERHEAD CABLE

(75) Inventors: Claude Venne, Brewerton, NY (US); Bruno Poirier, East Greenbush, NY (US)

(73) Assignee: Michels Corporation, Brownsville, WI (US)

(*) Notice: Subject to any disclaimer, the term of this patent is extended or adjusted under 35 U.S.C. 154(b) by 833 days.

(21) Appl. No.: 12/768,528

(22) Filed: Apr. 27, 2010

(65) Prior Publication Data

US 2011/0259633 A1    Oct. 27, 2011

(51) Int. Cl.
| | |
|---|---|
| E04H 12/24 | (2006.01) |
| H02G 7/05 | (2006.01) |
| H02G 1/08 | (2006.01) |
| H02G 1/02 | (2006.01) |
| H01B 17/30 | (2006.01) |
| H01B 17/26 | (2006.01) |
| B63B 35/03 | (2006.01) |

(52) U.S. Cl.
USPC .............. 174/45 R; 174/153 R; 174/40 R; 174/152 R; 254/134.3 FT; 254/134.3 R; 254/134.3 PA

(58) Field of Classification Search
USPC ............. 174/45 R, 40 R, 152 R, 153 R; 254/134.3 FT, 134.3 R, 134.3 PA
See application file for complete search history.

(56) References Cited

U.S. PATENT DOCUMENTS

| | | | |
|---|---|---|---|
| 3,703,286 A | 11/1972 | Adkin | |
| 4,290,380 A | 9/1981 | Bolen | |
| 4,411,409 A * | 10/1983 | Smith | 254/134.3 FT |
| 4,519,564 A | 5/1985 | Nadherny | |
| 4,690,381 A | 9/1987 | Asai | |
| 4,709,922 A | 12/1987 | Slade, Jr. et al. | |
| 5,564,378 A | 10/1996 | Rodriguez | |
| 6,305,880 B1 | 10/2001 | Carter et al. | |
| 6,524,031 B2 | 2/2003 | Carter et al. | |
| 6,793,442 B2 | 9/2004 | Carter et al. | |
| 6,972,377 B2 * | 12/2005 | Sawyer et al. | 174/135 |
| 7,478,794 B1 * | 1/2009 | Gohlke et al. | 254/134.3 FT |
| 2005/0279977 A1 | 12/2005 | Kerry | |
| 2007/0105443 A1 | 5/2007 | Ray | |
| 2008/0172873 A1 * | 7/2008 | Goldsworthy et al. | 29/857 |
| 2009/0039325 A1 * | 2/2009 | Gunter et al. | 254/134.3 R |
| 2009/0302286 A1 * | 12/2009 | Stevens et al. | 254/134.3 R |

* cited by examiner

*Primary Examiner* — Lee D Wilson
*Assistant Examiner* — Nirvana Deonauth
(74) *Attorney, Agent, or Firm* — Michael Best & Friedrich LLP

(57) ABSTRACT

An overhead tower assembly comprising an overhead tower, a threading device attached to the tower and defining an opening, a cable positioned through the opening, and a cable catcher attached to the cable. The catcher includes a body secured to the cable and sized to fit through the opening, and an arm attached to the body and movable relative to the body between a collapsed position, having a cross-section smaller than the opening, and an expanded position, having a cross-section larger than the opening. The catcher and can be used to perform a method including attaching the catcher to the cable, inserting an end of the cable through the threading device, pulling the cable through the threading device, contacting the arm with the threading device, moving the arm from the expanded position toward the collapsed position, continuing to pull the cable until the catcher has passed through the threading device, and moving the arm back to the expanded position.

19 Claims, 3 Drawing Sheets

DEVICE AND METHOD FOR STRINGING OVERHEAD CABLE

BACKGROUND

The present invention relates to devices for stringing cable overhead, such as when stringing power lines onto a series of towers.

Cables are commonly strung overhead on towers (e.g., poles or lattice structures) for transmission of electricity, telephone signals, or data. Prior to stringing the cable, a pilot rope is typically pulled off of a spool and threaded through a series of pulley blocks that are temporarily attached to the tower. The end of the rope is then attached to the cable, and the rope is pulled through the pulley blocks, resulting in the cable being pulled through the pulley blocks. The cable can then be transferred from the pulley blocks to the tower. Alternatively, the cable can be threaded directly onto the pulley blocks without the use of a pilot rope.

Unless otherwise noted, the use of the term "cable" is meant to include cables, ropes, wires, or any other elongated, flexible member that one would want to string onto a tower or through a series of pulley blocks.

SUMMARY

When pulling a cable through the pulley blocks, it is desirable to maintain a tension on the cable in order to prevent excessive sagging of the cable between adjacent pulley blocks. This can be important when the cable is traversing structure below, such as a roadway, river, or power line. Back tension can be provided by resistance in the spool, and front tension is typically provided by holding the lead end of the cable tight (e.g., by holding the end manually or attaching the end of the cable to a solid structure). The need to manually hold the cable or to attach the cable to a structure can be time consuming and require excessive man hours.

The present invention provides a device and method that alleviates the need to manually hold the end of a cable tight or attach the end of the cable to a structure when trying to maintain tension on the cable being threaded through an overhead opening. More specifically, the device can be used when threading a cable to an overhead tower that has a threading device secured to it. The device is called a cable catcher and comprises a body sized to fit through the opening and having means for engaging the cable (e.g., a clamp), and an arm attached to the body and movable relative to the body between a collapsed position, having a cross-section smaller than the opening, and an expanded position, having a cross-section larger than the opening. Preferably, the arm is biased toward the expanded position.

In one embodiment, the body comprises an opening sized to receive the cable. In this embodiment, the means for engaging the cable can be provided by making the body from two parts secured together and adapted to compress the cable in between. Preferably, the body includes a substantially cylindrical main portion and a rounded nose portion.

The catcher and can be used to string a cable through a threading device (e.g., a pulley block) attached to an overhead tower. The method includes attaching (e.g., clamping) the catcher to the cable, inserting an end of the cable through the threading device, pulling the cable through the threading device, contacting the arm with the threading device, moving the arm from the expanded position toward the collapsed position, continuing to pull the cable until the catcher has passed through the threading device, and moving the arm back to the expanded position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
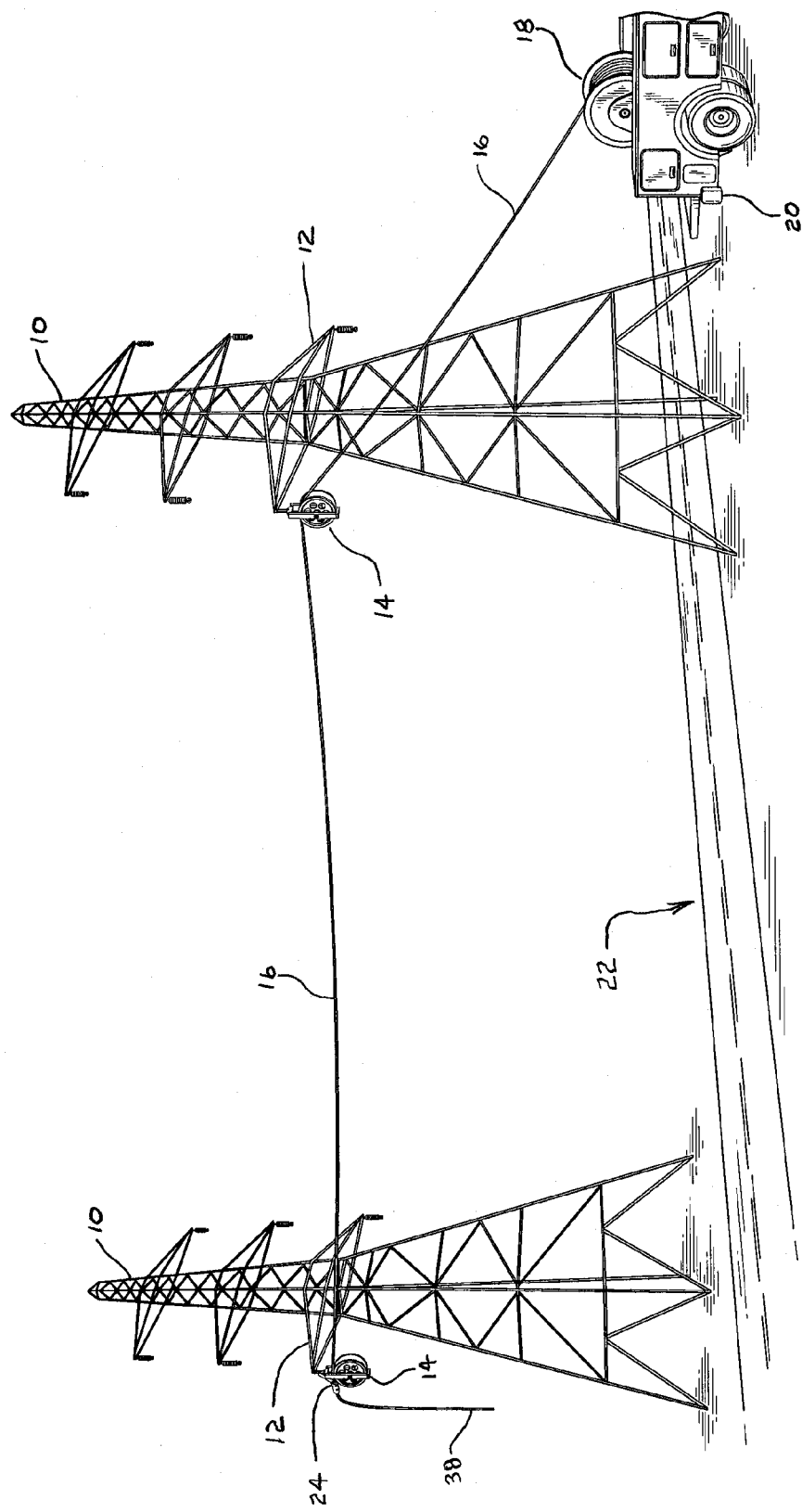
FIG. 1 illustrates a catcher embodying the present invention and being used to string a rope through pulley blocks and over a roadway.

FIG. 1 illustrates two lattice-type, overhead towers 10 that are designed to support a series of electrical cables overhead. Each tower 10 includes a series of arms 12 from which the electrical cable will be suspended after the installation process. During the installation process, threading devices in the form of pulley blocks 14 are suspended from the arms 12 to facilitate the threading of a pilot rope/cable 16. In the illustrated embodiment, a pilot rope 16 is being threaded through the pulley blocks 14 before the cable is pulled through, as is generally known in the art. The rope 16 is provided from a spool 18 that is mounted to a vehicle 20, and the spool 18 is provided with resistance to facilitate back tension on the rope 16. In the illustrated embodiment, the towers 10 are positioned on opposing sides of a roadway 22, and therefore it is desirable to limit the amount of sagging of the rope 16 between the towers 10.

Figure 2:
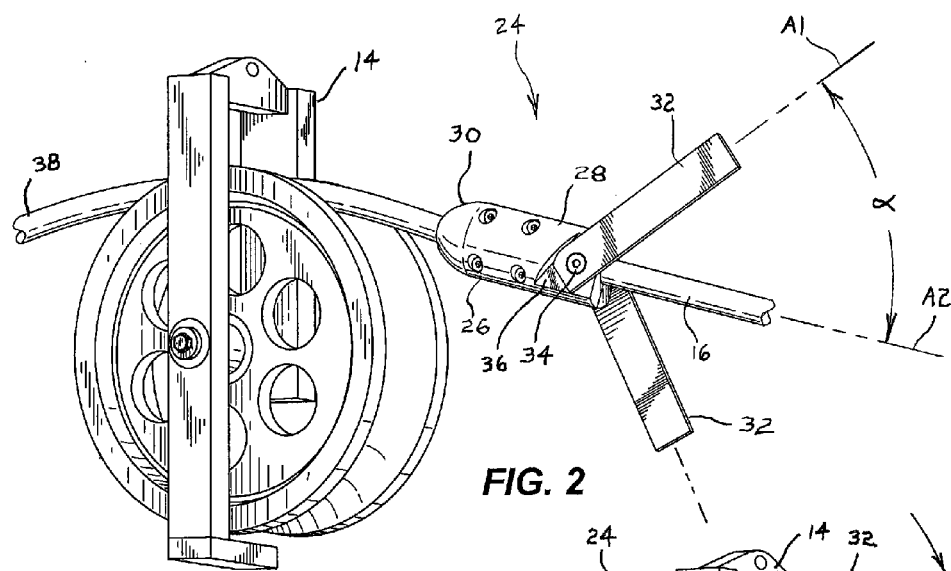
FIG. 2 is an enlarged view of the catcher of FIG. 1 attached to a rope and before it passes through a pulley block.

Before the rope 16 is threaded through the pulley blocks 14, a rope catcher 24 is secured to the rope 16. Referring to FIG. 2, the rope catcher 24 includes a body 26 that is substantially bullet-shaped with a cylindrical main portion 28 and a semi-spherical nose portion 30. The illustrated body 28 is a two-piece design that facilitates sandwiching the rope 16 in between, as described below in more detail.

Figure 3:
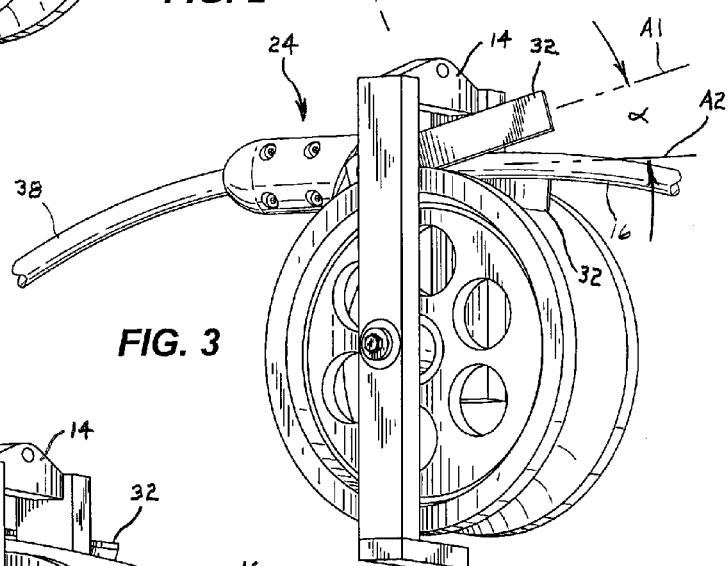
FIG. 3 is the view of FIG. 2 while the catcher passes through the pulley block.

Two arms 32 are pivotally connected to the back end of the main portion 28 of the body 26. Each arm 32 pivots about a shoulder bolt 34 that is threaded into the main portion 28. Each arm 32 defines a longitudinal axis A1 that is generally angled relative to the longitudinal axis A2 of the body 26. More specifically, each arm 32 can be pivoted relative to the body 26 from an angle α (defined between the longitudinal axis A1 of the arm 32 and the longitudinal axis A2 of the body 26) of about 45 degrees (FIG. 2) toward an angle α of about 0 degrees (FIG. 3). The pivoting end of each arm 32 is positioned in a recess 36 in the body 26 such that, when the arms 32 are folded into alignment with the body 26, the arms 32 can pass through any sized opening that the body 26 passes through. Each arm 32 is biased toward the expanded position shown in FIG. 2, but can be moved toward the collapsed position of FIG. 3 with relatively little force.

Figure 4:
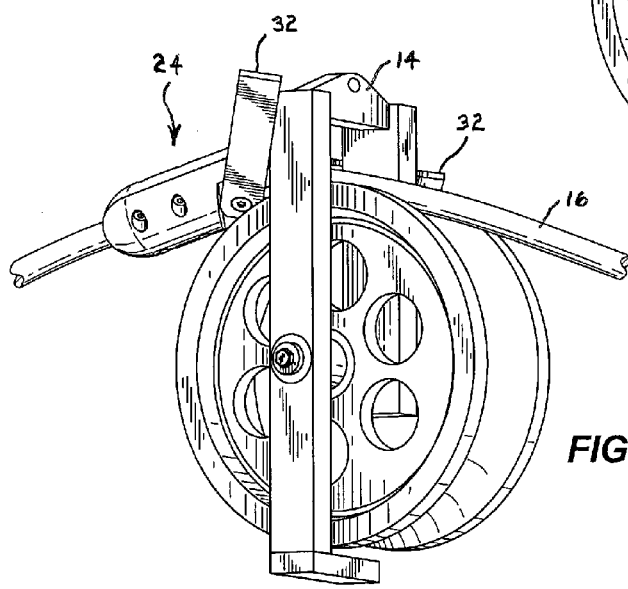
FIG. 4 is the view of FIG. 3 after the catcher passes through the pulley block.

In operation, with the catcher 24 secured to the rope 16, the end 38 of the rope 16 can be threaded through the pulley block 14, as shown in FIG. 2. As the rope 16 is being pulled through the pulley block 14, the catcher 24 moves toward the pulley block 14 in the expanded position, as shown in FIG. 2. As the catcher 24 passes through the pulley block 14, the arms 32 move toward the collapsed position to allow the catcher 24 to move through the pulley block 14, as shown in FIG. 3. After moving through the pulley block 14, the arms 32 move back to the expanded position to thereby prevent the catcher 24 from moving back through the pulley block 14, as shown in FIG. 4. With this arrangement, because the catcher 24 is secured to the rope 16, the rope 16 is inhibited from moving backward through the pulley block 14. Referring back to FIG. 1, with this arrangement, the rope catcher 24 provides front tension on the rope 16 by preventing the rope 16 from being pulled back through the second pulley block 14, and the spool 18 provides back tension on the rope 16. This arrangement limits the amount of sagging of the rope 16 between the towers 10, and thereby provides sufficient clearance with the roadway 22.

Figure 5:
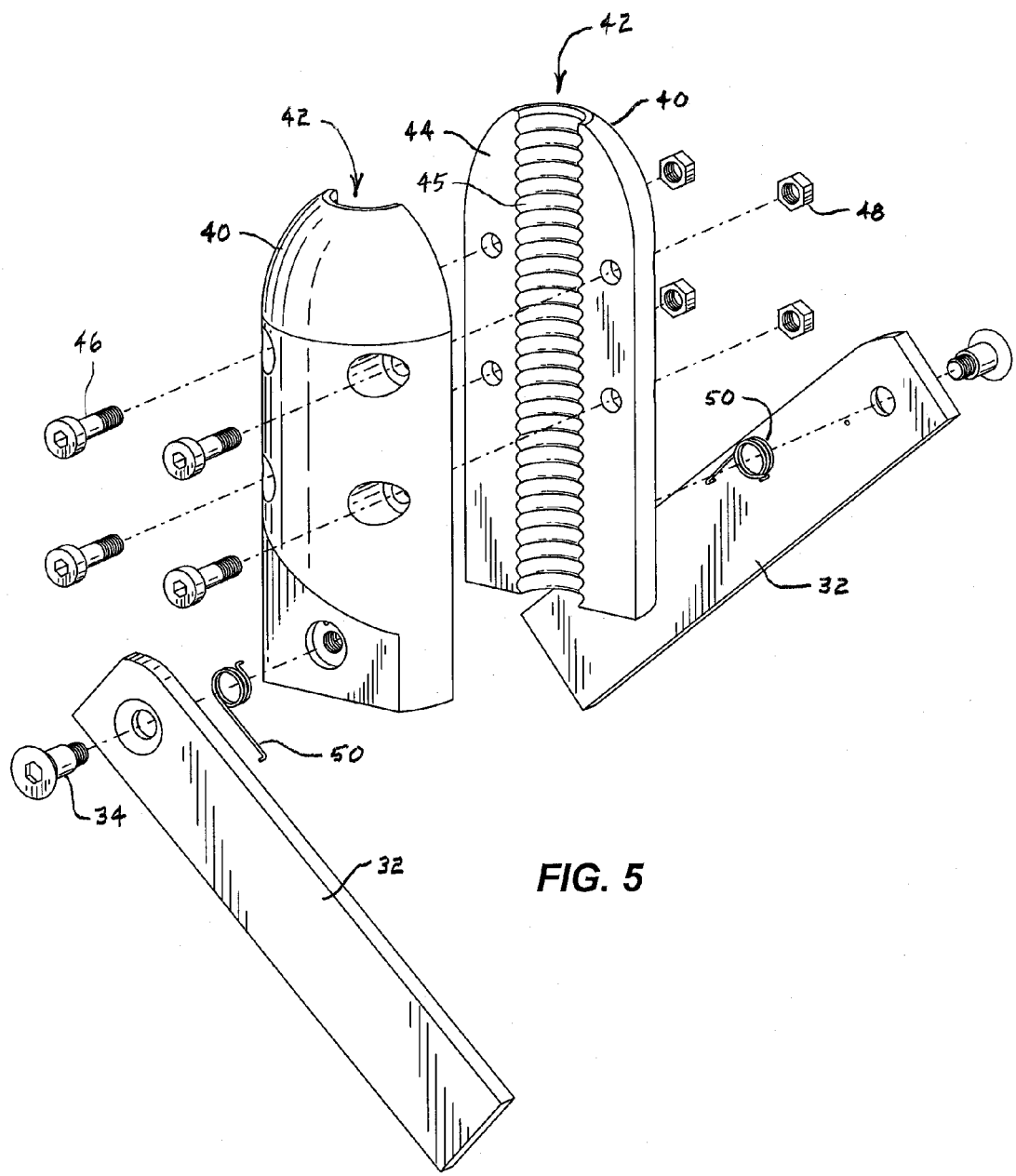
FIG. 5 is an exploded view of the catcher shown in FIGS. 1-4.

Referring to FIG. 5, the body of the catcher includes two halves 40 that each have a semi-cylindrical channel 42 formed longitudinally on the inner face 44. When the two halves 40 are positioned together, the channels 42 cooperatively form a cylindrical opening that is slightly smaller than the diameter of the rope 16 to which it is to be attached. In this regard, when the two halves 40 are secured together to sandwich the rope 16, the rope will be compressed and clamped to secure the rope 16 relative to the catcher. The surface of each channel 42 is provided with annular grooves 45 to enhance the frictional engagement with the rope 16. Alternative engagement means, such as protrusions or knurls, could also be used.

The two halves 40 of the body are secured together by four bolts 46 passing through the halves and being secured by four corresponding nuts 48. Each arm 32 is secured to one of the halves 40 by a corresponding shoulder bolt 34 that passes through the arm 32 and threads into the corresponding half 40 of the body. A torsion spring 50 biases the arm 32 to the expanded position.

Thus, the invention provides, among other things, an apparatus and method for facilitating the stringing of cable to an overhead tower. Various features and advantages of the invention are set forth in the following claims.

The invention claimed is:

1. A cable catcher for facilitating the stringing of cable through an opening in a threading device attached to an overhead tower, the cable catcher comprising:
   a body sized to fit through the opening and having means for engaging the cable; and
   an arm attached to the body and movable relative to the body between a collapsed position, having a cross-section smaller than the opening, and an expanded position, having a cross-section larger than the opening and larger than the cross-section in the collapsed position,
   wherein the body includes a front end, a back end, a longitudinal axis that extends through the front end and the back end of the body, and a cable opening that extends through the front end and the back end of the body along the longitudinal axis to allow a portion of the cable to pass through the cable opening and extend beyond the front end of the body,
   wherein the arm moves away from the longitudinal axis of the body when the arm moves from the collapsed position to the expanded position.

2. The cable catcher of claim 1, wherein the body comprises two parts secured together and adapted to compress the cable in between.

3. The cable catcher of claim 1, wherein the body includes a substantially cylindrical main portion and a rounded nose portion at the front end of the body.

4. The cable catcher of claim 1, wherein the arm is secured to the body at an attachment location, and wherein the body includes a recess at the attachment location.

5. The cable catcher of claim 1, wherein the arm is biased toward the expanded position.

6. The cable catcher of claim 1, wherein the catcher includes two arms positioned on opposing sides of the body.

7. An overhead tower assembly comprising:
   an overhead tower;
   a threading device attached to the tower and defining an opening;
   a cable positioned through the opening; and
   a cable catcher including:
      a body secured to the cable and sized to fit through the opening; and
      an arm attached to the body and movable relative to the body between a collapsed position, having a cross-section smaller than the opening, and an expanded position, having a cross-section larger than the opening,
      wherein the body includes a front end, a back end, a longitudinal axis that extends through the front end and the back end of the body, and a cable opening that extends through the front end and the back end of the body along the longitudinal axis to allow a portion of the cable to pass through the cable opening and extend beyond the front end of the body and through the opening of the threading device before the cable catcher passes through the opening of the threading device.

8. The assembly of claim 7, wherein the threading device comprises a pulley block.

9. The assembly of claim 7, wherein the cable is secured in the cable opening.

10. The assembly of claim 7, wherein the body comprises two parts adapted to be secured together to compress the cable in between.

11. The assembly of claim 7, wherein the front end of the body includes a rounded nose portion facing away from the threading device.

12. The assembly of claim 7, wherein the arm is secured to the body at an attachment location, and wherein the body includes a recess at the attachment location.

13. The assembly of claim 7, wherein the arm is biased toward the expanded position.

14. The assembly of claim 7, wherein the catcher includes two arms positioned on opposing sides of the body.

15. A method of stringing a cable through a threading device attached to an overhead tower, comprising:
   attaching a catcher to the cable, the catcher including a body and an arm attached to the body and movable between an expanded position and a collapsed position;
   inserting an end of the cable through the threading device;
   pulling a portion of the cable through the threading device;
   after pulling the portion of the cable through the threading device, contacting the arm with the threading device;
   thereafter, moving the arm from the expanded position toward the collapsed position;
   continuing to pull the cable until the catcher has passed through the threading device; and
   moving the arm back to the expanded position.

16. The method of claim 15, wherein attaching includes clamping the catcher to the cable.

17. The method of claim 15, wherein the threading device comprises a pulley block and the catcher includes two arms positioned on opposing sides of the body, and wherein contacting comprising contacting both arms with the pulley block.

18. The method of claim 17, wherein moving includes moving both arms toward the respective collapsed position.

19. The method of claim 18, wherein moving the arm back comprises moving both arms back to the respective expanded position.

* * * * *